(12) United States Patent
Morris et al.

(10) Patent No.: US 6,682,589 B2
(45) Date of Patent: Jan. 27, 2004

(54) LIGHTFAST INK-JET DYE SET HAVING COLOR GAMUT OF SILVER HALIDE PRINTS

(75) Inventors: Peter C. Morris, San Diego, CA (US); Stephen W. Bauer, San Diego, CA (US); Shirley Lee, Poway, CA (US); Keshava A. Prasad, San Marcos, CA (US); Jeffrey H. Barr, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 140 days.

(21) Appl. No.: 10/002,066

(22) Filed: Oct. 30, 2001

(65) Prior Publication Data

US 2003/0101904 A1 Jun. 5, 2003

(51) Int. Cl.$^7$ ................................................ C09D 11/00
(52) U.S. Cl. ..................................................... 106/31.48
(58) Field of Search ........................... 106/31.48, 31.27; 347/100

(56) References Cited

U.S. PATENT DOCUMENTS

| | | | |
|---|---|---|---|
| 4,818,285 A | 4/1989 | Causley et al. | 106/31.43 |
| 4,963,189 A | 10/1990 | Hindagolla | 106/31.52 |
| 5,145,519 A | 9/1992 | Kappele | 106/31.51 |
| 5,273,573 A | 12/1993 | Kappele | 106/31.51 |

(List continued on next page.)

FOREIGN PATENT DOCUMENTS

| | | |
|---|---|---|
| EP | 0 863 190 | 9/1998 |
| EP | 1 077 239 | 2/2001 |
| EP | 1 081 198 | 3/2001 |
| EP | 1 254 933 | 11/2002 |

Primary Examiner—Helene Klemanski

(57) ABSTRACT

A specific dye set for formulating yellow, cyan, magenta, and black inks comprises Direct Yellow 132, at least one other yellow dye, Direct Blue 199, a magenta dye comprising a dye having the structure

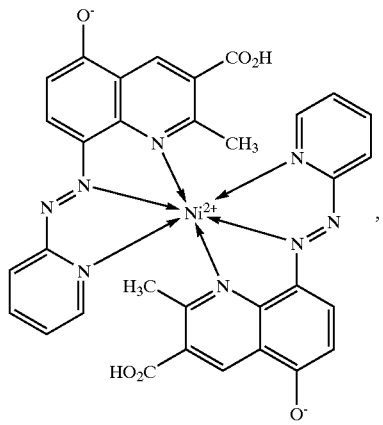

and, optionally, Pacified Reactive Black 31, respectively. The dye set provides excellent ink-jet prints having excellent lightfastness when exposed to office light, excellent imaging onto glossy inkjet media, and large color gamut which substantially encompasses the color space for a silver halide reference print. The aqueous inks each comprise from about 0.1 to about 5 wt % of at least one dye with the black ink comprising from about 0.5 to about 5 wt % of at least one colorant; from about 5 to about 20 wt % of at least one organic solvent; 0 to about 1.5 wt % of at least one component independently selected from the group consisting of surfactants, buffers, biocides, and metal chelators; and the balance water.

32 Claims, 2 Drawing Sheets

U.S. PATENT DOCUMENTS

| | | | |
|---|---|---|---|
| 5,534,051 A | 7/1996 | Lauw | 106/31.43 |
| 5,614,007 A | 3/1997 | Kurabayashi et al. | 106/31.27 |
| 5,725,641 A | 3/1998 | MacLeod | 106/31.5 |
| 5,749,951 A * | 5/1998 | Yoshiike et al. | 106/31.27 |
| 5,772,742 A | 6/1998 | Wang | 106/31.27 |
| 5,851,273 A | 12/1998 | Morris et al. | 106/31.27 |
| 5,858,075 A | 1/1999 | Deardurff et al. | 106/31.27 |
| 5,980,622 A | 11/1999 | Byers | 106/31.48 |
| 6,001,161 A | 12/1999 | Evans et al. | 106/31.48 |
| 6,053,969 A | 4/2000 | Lauw et al. | 106/31.27 |
| 6,066,443 A | 5/2000 | Dobles et al. | 430/583 |
| 6,183,548 B1 * | 2/2001 | Erdtmann et al. | 106/31.48 |
| 6,508,549 B1 * | 1/2003 | Romano et al. | 347/100 |
| 6,513,923 B1 * | 2/2003 | Evans et al. | 347/100 |
| 2002/0185034 A1 * | 12/2002 | Koga et al. | 106/31.27 |
| 2003/0061963 A1 * | 4/2003 | Blease et al. | 106/31.27 |
| 2003/0070580 A1 * | 4/2003 | Blease et al. | 106/31.27 |

* cited by examiner

LIGHTFAST INK-JET DYE SET HAVING COLOR GAMUT OF SILVER HALIDE PRINTS

FIELD OF THE INVENTION

The present invention generally relates to ink-jet printing, and in particular to a specific dye and ink sets for improving ink-jet print quality.

BACKGROUND OF THE INVENTION

Ink-jet printing is a non-impact printing process in which droplets of ink are deposited on a print medium in a particular order to form alphanumeric characters, area-fills, and other patterns thereon. Low cost and high quality of the hardcopy output, combined with relatively noise-free operation, have made ink-jet printers a popular alternative to other types of printers used with computers. Notwithstanding their recent success, intensive research and development efforts continue toward improving ink-jet print quality. A surge in interest in ink-jet printing has resulted in the need to produce high quality prints at a reasonable cost. The challenge remains to further improve the print quality and lightfastness of ink-jet prints. The emerging use of ink-jet prints for digital photos, requires high-resolution images that have accurate color and are durable.

Color ink-jet printers, such as a DesignJet® 10 ps printer available from Hewlett-Packard Company, typically use three inks of differing hues: magenta, yellow, and cyan, and optionally black. The particular set of colorants, e.g., dyes, used to make the inks is called a "primary dye set." A spectrum of colors, e.g., secondary colors, can be generated using different combinations of the primary dye set. In printing processes such as lithography, dye transfer, and some types of thermal transfer, it is possible to vary spot size so that less is demanded of the primary colored inks when producing a good secondary color. When the color inks are used in a binary printing device, that is, one in which a dot of color is either present or absent, e.g., a thermal ink-jet printer, the ability of the primaries to give recognizable secondary colors is even more important. When such device is to be used for printing images that will also be printed and compared to images printed by other modalities such as offset presses or dye sublimation printers, it is important that the colors produced by the inkjet printer are capable of encompassing and matching commonly accepted industry color descriptions, such as the color gamut (color space) for a Kodak Duralife® silver halide print. If such ink is to be used in an ink-jet printing device, characteristics such as crusting, long-term stability, and materials compatibility must also be addressed. If the ink is to be used in a thermal ink-jet printer, the further constraint of being thermally stable (kogation-resistant) is added.

In general, a successful ink set for color ink-jet printing must be compatible with the ink-jet pen and the printing system. Some of the required properties for the ink-jet ink include: good crusting resistance, good stability, the proper viscosity, the proper surface tension, little color-to-color bleed, rapid dry time, no deleterious reaction with the printhead components, high solubility of the dyes in the vehicle, consumer safety, low strike through, high color saturation, good dot gain, and suitable color characteristics. Furthermore, the durability of the printed image, e.g., light and water fastness, plays an important role in the quality of the printed ink-jet image.

Any given perceived color can be described using any one of the color spaces, such as CIELAB, and Munsell, as is well known in the art. For example, in the Munsell color space a given color is defined using three terms, Hue (H), Value (V), and Chroma (C). In the CIELAB color space, a color is defined using three terms L*, a*, and b*. L* defines the lightness of a color, and it ranges from zero (black) to 100 (white). The terms a* and b*, together, define the hue. The term a* ranges from a negative number (green) to a positive number (red). The term b* ranges from a negative number (blue) to a positive number (yellow). Additional terms such as h° (hue angle) and C* (chroma) are used to further describe a given color, wherein $$h° = \tan-1 b^*/a^*$$ EQUATION 1

$$C^* = (a^*2 + b^*2)$$ EQUATION 2

The L*, a*, and b* or the Munsell H, V, and C can be used to calculate the volume of space that a specific dye set can produce—the larger the volume the more colors the dye set is capable of producing.

Inks are known which possess one or more of the foregoing properties. However, few inks are known that possess all the foregoing properties, since an improvement in one property often results in the degradation of another property. Thus, many inks used commercially represent a compromise in an attempt to achieve an ink evidencing at least an adequate response in each of the foregoing considerations. For example, inks are known which can obtain the color gamut of silver halide prints, such as those used obtained in photographic prints, but cannot obtain the lightfastness of such silver halide prints. This shortcoming of these known inks is a poor lightfastness associated with the magenta and magenta-containing colors. Accordingly, investigations continue into developing ink formulations which have improved properties and which do not improve one property at the expense of the others. Thus, there remains a need in the art to further improve the print quality, color gamut, and lightfastness of the ink-jet prints without sacrificing pen performance and reliability, particularly when trying to reproduce the color gamut of silver halide prints.

SUMMARY OF THE INVENTION

In accordance with the invention, inks suitable for use in ink-jet inks and method for formulating the same are provided. A specific dye set for formulating the yellow, cyan, magenta, and black inks is disclosed, comprising Direct Yellow 132, at least one other yellow dye, a cyan ink comprising Direct Blue 199, magenta ink comprising dye having the structure:

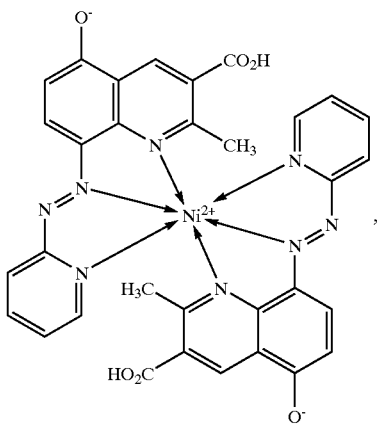

and, optionally, Pacified Reactive Black 31, respectively. This dye set provides excellent ink-jet prints having excellent lightfastness when exposed to office light, excellent imaging onto glossy inkjet media, and large color gamut which substantially encompasses the color space for a Kodak Duralife® silver halide reference print. In the practice of the invention, the yellow, cyan, and magenta aqueous inks each comprise from about 0.1 to about 5 wt % of at least one dye with the black ink comprising from about 1 to about 10 wt % of at least one colorant; from about 5 to about 20 wt % of at least one organic solvent; 0 to about 1.5 wt % of at least one component independently selected from the group consisting of surfactants, buffers, biocides, and metal chelators; and the balance water.

The present ink compositions offer good lightfastness and excellent color gamut that substantially encompass the color gamut volume of a silver halide reference print, and are reliable in an ink-jet printing engine.

DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1:
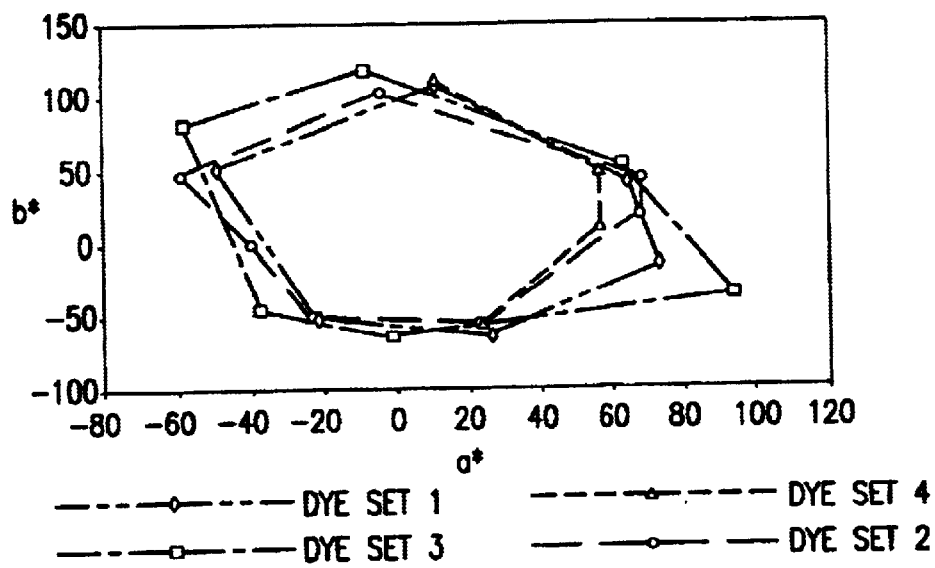
FIG. 1 represents a color space graph for four particular print samples.

The invention described herein is directed to dye sets for use with commercially available ink-jet printers such as Design Jets® 10 ps printers, manufactured by Hewlett-Packard Company, of Palo Alto, Calif. More specifically, a specific dye set for formulating the yellow, cyan, magenta and, optionally, light dye load cyan, light dye load magenta, and black inks is disclosed. The dye set enables the production of high-quality prints having large color gamut and excellent lightfastness. The inks formulated according to the invention produce images having color appearance that meets commercial requirements for color accuracy and durability. The present yellow, cyan, and magenta aqueous ink compositions each comprise in general from about 0.1 to about 5 wt % of at least one dye, and a vehicle comprising the following components (in wt % of total ink composition): from about 5 to about 20 wt % of at least one organic solvent; 0 to about 1.5 wt % of at least one component independently selected from the group consisting of surfactants, buffers, biocides, and metal chelators; and the balance water.

All concentrations herein are in weight percent of total ink composition unless otherwise indicated. The purity of all components is that employed in normal commercial practice for ink-jet inks.

Colorants

Yellow

The yellow ink of the present invention contains Direct Yellow 132 dye (DY132), available as Projet Yellow 1G from Zeneca Colors, as well as at least one other yellow dye such as, for example, Ilford Yellow 104 (IL104), available from Ilford AG, Rue de l'Industrie, CH-1700 Fribourg, Switzerland. The DY132 and IL104 may be used in any one of its salt forms. The preferred yellow ink contains DY132 and IL104 associated with Na ion.

The yellow dye is present in an amount from about 2.5 to about 4.5 wt. %, and preferably, from about 3 to about 4 wt. %. In setting the concentration of the yellow dye, it is desired that the ink has an absorbance of about 0.001 to 0.12 at the lambda maximum of about 401 to 405 for a 1:10,000 dilution Cyan The cyan ink of the present invention contains Direct Blue 199 dye (DB199), available from Zeneca Colors as Projet Cyan 1. The DB199 may be used in any one of its salt forms. The preferred cyan ink contains DB199 associated with Na ion.

The cyan dye is present in an amount from about 1 to about 4 wt. %, preferably from about 1.5 to about 2.5 wt. %. In setting the concentration of the cyan dye, it is desired that the ink have an absorbance of about 0.01 to 0.27 at the lambda maximum of about 616 to 620 nm for a 1:10,000 dilution.

Magenta

The magenta ink of the present invention contains dye having the structure

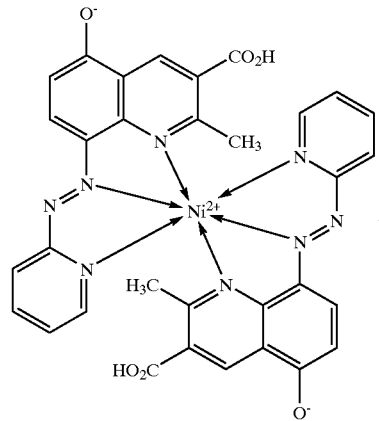

which is disclosed as Dye 6 in U.S. Pat. No. 6,001,161, invented by Evans and Weber, and issued to Eastman Kodak Co., Rochester, N.Y. The preferred magenta ink contains the same magenta dye described above associated with Na ion. The magenta dye is preferably measured in 1% ethanolamine and is present in an amount from about 0.5 to about 2 wt. %, and most preferably from about 0.5 to about 1 wt. %. In setting the concentration of the magenta dye, it is desired that the ink have an absorbance of about 0.01 to 0.57 at the lambda maximum of about 551 to 555 nm for a 1:10,000 dilution.

Light Dye Load Cyan

The light dye load cyan ink of the present invention contains Direct Blue 199 dye (DB199). The DB199 may be used in any one of its salt forms. The preferred cyan ink contains DB199 associated with Na ion. The cyan dye is present in an amount from about 0.05 to about 1 wt. %, preferably from about 0.1 to about 0.75 wt. %. In setting the concentration of the cyan dye, it is desired that the ink have an absorbance of about 0.001 to 0.05 at the lambda maximum of about 551 to 555 nm for a 1:10,000 dilution.

Light Dye Load Magenta

The light dye load magenta ink of the present invention contains dye having the structure:

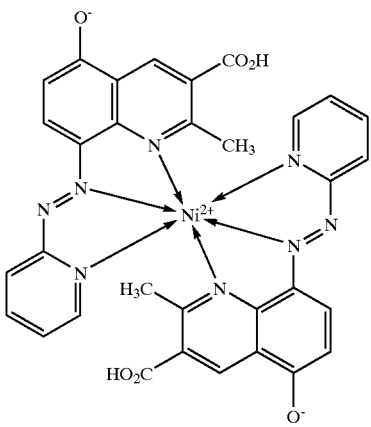

which is disclosed as Dye 6 in U.S. Pat. No. 6,001,161, invented by Evans and Weber, and issued to Eastman Kodak Co., Rochester, N.Y. The preferred magenta ink contains the above described magenta dye associated with Na ion. The magenta dye is present in an amount from about 0.05 to about 1 wt. %, preferably from about 0.1 to about 0.75 wt. %. In setting the concentration of the cyan dye, it is desired that the ink have an absorbance of about 0.01 to 0.11 at the lambda maximum of about 551 to 555 nm for a 1:10,000 dilution.

Black

The dye set of the present invention may optionally include a black ink. The black ink suitably employed in the practice of the invention can be dye based or pigment-based colorant, preferably, dye-based. The black ink can also be a composite of the three primary colors, yellow, cyan, and magenta. Suitable black dye-based inks are disclosed and claimed, for example, in U.S. Pat. No. 4,963,189, entitled "Waterfast Ink Formulations with a Novel Series of Anionic Dyes Containing Two or More Carboxyl Groups" and assigned to the present assignee. Preferably, the black ink comprises Reactive Black 31, Pacified Reactive Black 31, Direct Black 168, or a mixture thereof. Most preferably the black ink comprises Pacified Reactive Black 31, wherein the chromophore is present in the vinyl sulfone form, the ethyl hydroxy form, or a mixture thereof; as described in U.S. patent application Ser. No. 08/741,880, now U.S. Pat. No. 5,725,641, by MacLeod, filed Oct. 30, 1996, entitled "Lightfast Inks for Ink-Jet Printing," assigned to the assignee of the present invention, and incorporated herein by reference. Pacified Reactive Black 31 (PRB 31) is made by the pacification of Reactive Black 31 (RB31) dye (available as Remazol Black R-KRL from Hoechst Chemical Company) employing well know pacification methods. The pacification process is accomplished by making an aqueous solution of Reactive Black 31. The aqueous solution is heated to 60° C. The dye is then hydrolyzed by addition of sodium hydroxide in amounts sufficient to bring the pH of the solution to a range of about 8 to about 12. The pH is maintained at this range by further additions of sodium hydroxide to the solution. After the completion of the hydrolysis, the pH of the solution is lowered to about 7 using hydrochloric acid. The sulfate ions generated in the reaction, and the chloride and sodium ions added during the process, can optionally be removed by reverse osmosis or other conventional methods. The inks of present invention preferably contain less than about 1 wt % sulfate ion. More preferably the inks contain less than about 1000 parts per million sulfate ion, with less than about 100 parts per million being the most preferred. The resulting pacified dye solution will contain either or both the hydrolyzed forms, namely, vinyl sulfone form and ethyl hydroxy form. Both hydrolyzed forms of PRB 31 are lightfast and suitable to make reliable ink-jet inks.

The black colorant is present in an amount from about 0.5 to about 5 wt. %, preferably, from about 1 to about 4 wt. %, and most preferably, from about 1 to about 2 wt. %. In setting the concentration of the black colorant, it is desired that the ink have an absorbance of about 0.02 to 0.20 at the lambda maximum of about 616 to 620 urn for a 1:10,000 dilution. Alternatively, the black ink may be provided prior to printing the color inks on a printing medium.

Vehicle

The inks of the present invention comprise an aqueous vehicle comprising the following components (in wt % of total ink composition): from about 5 to about 20 wt % of at least one water soluble organic solvent; 0 to about 1.5 wt % of at least one component independently selected from the group consisting of surfactants, buffers, biocides, and metal chelators; and the balance water.

Organic Solvent

The inks of the present invention comprise from about 5 to about 20 wt % organic solvent. More preferably, the inks comprise from about 8 to about 15 wt % organic solvent, with a concentration from about 9 to about 13 wt % being the most preferred. The water soluble organic solvents suitably employed in the present ink-jet ink compositions include any of, or a mixture of two or more, of such compounds as nitrogen-containing heterocyclic ketones, such as 2-pyrrolidone, N-methyl-pyrrolid-2-one (NMP), 1,3-dimethylimidazolid-2-one, and octyl-pyrrolidone; diols such as ethanediols, (e.g., 1,2-ethandiol), propanediols (e.g., 1,2-propanediol 1,3-propanediol 2-ethyl-2-hydroxy-methyl-1,3-propanediol, ethylhydroxy-propanediol (EHPD), butanediols (e.g., 1,2-butanediol, 1,3-butanediol, 1,4-butanediol), pentanediols (e.g., 1,2-pentanediol, 1,5-pentanediol), hexanediols (e.g., 1,6-hexanediol, 2,5-hexanediol, 1,2-hexanediol), heptanediols (e.g., 1,2-heptanediol, 1,7-heptanediol), octanediols (e.g., 1,2-octanediol, 1,8-octanediol); glycols and thioglycols, commonly employed in ink-jet inks, such as polyalkylene glycols such as polyethylene glycols (e.g., diethylene glycol (DEG), triethylene glycol tetraethylene glycol), polypropylene glycols (e.g., dipropylene glycol tripropylene glycol, tetrapropylene glycol), polymeric glycols (e.g., PEG 200, PEG 300, PEG 400, PPG 400), and thiodiglycol; and glycol ethers such as dipropylene glycol monobutyl ether, propylene glycol monobutyl ether, and ethylene glycol monobutyl ether, diethylene glycol monohexyl ether.

Preferably, the organic solvent comprises 1,2 diols of C5–C7, namely, 1,2-pentanediol, 1,2-hexanediol, and 1,2-heptanediol; and most preferably, 1,2-hexanediol is employed in the practice of the invention. Preferably, the organic solvent also comprises from about 0.1 to about 4 wt % neopentyl glycol, more preferably, from about 0.5 to about 2.5 wt %, and most preferably, from about 1 to about 2 wt %.

Surfactant

The inks of the present invention optionally comprise 0 to about 1.5 wt % surfactant. More preferably, the inks comprise from about 0.5 to about 1.3 wt % surfactant, with a concentration from about 0.8 to about 1.2 wt % being the most preferred.

In the practice of the invention, one or more surfactants may optionally be used. Non-ionic surfactants, such as secondary alcohol ethoxylates (e.g., Tergitol series available from Union Carbide Co.), non-ionic fluoro surfactants (e.g., FC170C available from 3M, non-ionic fatty acid ethoxylate surfactants (e.g., Alkamul PSMO-20 available from Rhone-Poulenc), non-ionic silicone surfactants (e.g., SilwetL7600 available from OSi Specialties, Inc. Danbury, Conn.), and fatty amide ethoxylate surfactants (e.g., Aldamide L203 available from Rhone-Poulenc) are preferred, with secondary alcohol ethoxylates being the most preferred. In the practice of the invention, the surfactant serves to prevent color to color bleed by increasing the penetration of the inks into the print medium, and to improve the spread of the ink on polymer coated media. Secondary alcohol ethoxylates are nonionic surfactants and are commercially available, for example, from Union Carbide Co. (Houston, Tex.) as the Tergitol series, such as Tergitol 15-S-5 and Tergitol 15-S-7.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Secondary alcohol ethoxylates suitably employed in the practice of the invention predominantly have from about 12 to about 18 carbon atoms in the aliphatic chain, while the number of ethoxylated units is predominantly in the range of from about 4 to about 8 units. Thus, "Tergitol 15-S-5" represents a secondary alcohol ethoxylate surfactant predominantly having about 15 carbons in its aliphatic chain and about 5 ethoxylated units. Tergitol 15-S-5 and Tergitol 15-S-7 are the preferred surfactants.

Buffer

The inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred.

Buffers employed in the practice of the invention to modulate pH can be organic-based biological buffers or inorganic buffers, preferably, organic-based. Further, the buffers employed should maintain a pH ranging from about 3 to about 9 in the practice of the invention, preferably about 6.5 to about 8 and most preferably from about 7.2 to 7.8. Examples of preferably-employed buffers include Trizma Base, available from companies such as Aldrich Chemical (Milwaukee, Wis.), 4-morpholineethanesulfonic acid (MES), b-hydroxy-4-morpholinepropanesulfonic acid (MOPSO), and 4-morpholinepropanesulfonic acid (MOPS). Most preferably, MOPSO is employed in the practice of the invention.

Metal Chelator

The inks of the present invention optionally comprise 0 to about 1.5 wt % metal chelator. More preferably, the inks comprise from about 0.1 to about 0.5 wt % metal chelator, with a concentration from about 0.1 to about 0.3 wt % being the most preferred.

Metal chelators employed in the practice of the invention are used to bind transition metal cations that may be present in the ink. Examples of preferably-employed metal chelators include: Ethylenediaminetetraacetic acid (EDTA), Diethylenetriaminepentaacetic acid (DTPA), trans-1,2-diaminocyclohexanetetraacetic acid (CDTA), (ethylenedioxy) diethylenedinitrilotetraacetic acid (EGTA), or other chelators that can bind transition metal actions.

More preferably, EDTA, and DTPA; and most preferably EDTA in its disodium salt form is employed in the practice of the invention.

Biocide

The inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred.

Any of the biocides commonly employed in ink-jet inks may be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide.

The specific ink set disclosed herein is expected to find commercial use in ink-jet color printing.

EXAMPLES

Inks were formulated and different qualities of the formulated inks were measured in an effort to assess the benefits attained in the practice of the invention, namely, effect of the dye set on color gamut and lightfade for the primary and secondary colors, and long resistor life for a printing system using refilling heads.

Example I

Print Sample Generation Method

Print samples of formulated inks, where necessary, were generated using a Hewlett-Packard Design Jet® 10 ps printer. The print media used included one or more of the following: uncoated paper such as HP colorfast photo paper C7013A available from Hewlett-Packard Company, Palo Alto, Calif.; and glossy coated paper media such as HP C6034A available from Hewlett-Packard Company.

Example II

Ink Formulations

Ink sets were prepared containing the dyes listed in Table 1.

TABLE I

| Ink Color | Dye Set 1 | Dye Set 2 | Dye Set 3 | Dye Set 4 |
|---|---|---|---|---|
| Magenta | Dye 6 of U.S. Pat. No. 6,001,161 (Kodak) | Ilford Magenta 377 | Acid Red 52 | Reactive Red 23 |
| Cyan | Direct Blue 199 | Direct Blue 199 | Acid Blue 9 | Direct Blue 199 |
| Yellow | Ilford Yellow 104 Direct Yellow 132 | Direct Yellow 132 | Acid Yellow 23 | Ilford Yellow 104 |
| black | PRB 31 Direct Black 168 | PRB 31 | Projet Fast Black 2 | PRB 31 |

Dye Set 1 represents a high color gamut and high fade resistance ink set made according to a particular embodiment of the present invention. Dye set 2 is a dye set representative of the ink sets disclosed in U.S. Pat. No. 5,851,273, issued to Morris et al. Dye sets 3 and 4 are alternative dye sets containing various magenta, cyan, yellow, and/or black dyes, which were prepared for purposes of comparative testing.

Exemplary aqueous vehicle for the ink sets comprised:

| Component | Preferred Component | Quantity |
|---|---|---|
| organic solvent | 1,2-hexanediol | 10% |
| | neopentyl alcohol | 2.0% |
| surfactant | Tergitol 15-S-5 | 1.00% |
| buffer | MOPSO | 0.10% |
| metal chelator | EDTA | 0.10% |
| biocide | Proxel GXL | 0.10% |
| water | | balance |

Example III

Effect of Dye Set on Color Quality

The effect of dye sets 1–4 on color quality was measured by generating color palette squares of approximately 1 cm$^2$ of the three primaries, namely, yellow, cyan, and magenta; and the three secondaries, namely, red, green, and blue; and black, using inks formulated according to the above dye sets and vehicle on polymer coated polyester film. The color palettes were generated using Dot on Dot print mode at 100% print density using a nominal drop volume of about 10 pl per 1200 dpi pixel per color plane.

The a* and b* coordinates of the printed samples were measured using a commercial colorimeter, such as the Minolta CM503c spectrophotometer, available from the Minolta Camera Co., Japan The color space for each print sample is represented in FIG. 1. As can be noted from the comparative data presented in the graph of FIG. 1, Dye Set 1 and Dye Set 3 exhibited a high color gamut, Dye set 2 exhibited a medium color gamut, and Dye set 4 exhibited a low color gamut.

Figure 2:
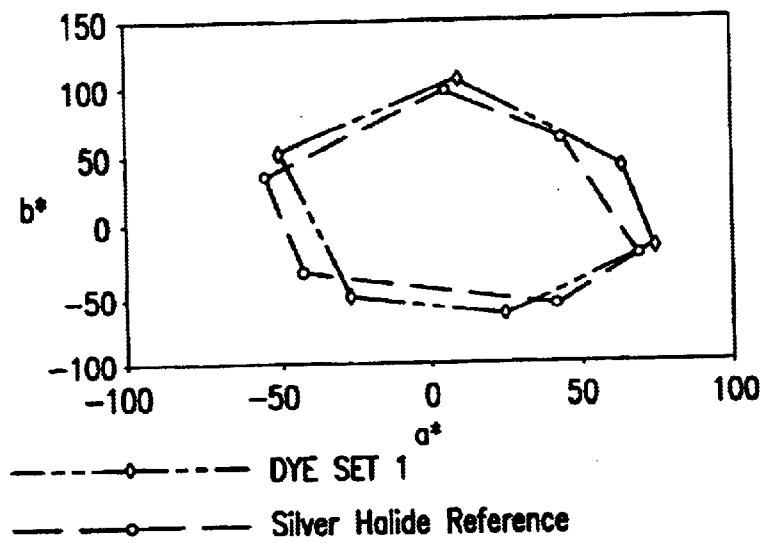
FIG. 2 represents the color space for a dye set of the present invention compared against a Kodak Duralife® silver halide reference print.

The color space for Dye Set 1 (described in Table I) was also compared against the Kodak Duralife® silver halide reference print. The color space for each print sample is represented in FIG. 2. As can be noted from the graph presented in FIG. 2, the inks formulated according to the invention (comprising Dye Set 1) substantially encompassed the color space for a Kodak DuraLife® silver halide reference print.

Example IV

Effect of Dye Set of Lightfastness

Figure 3:
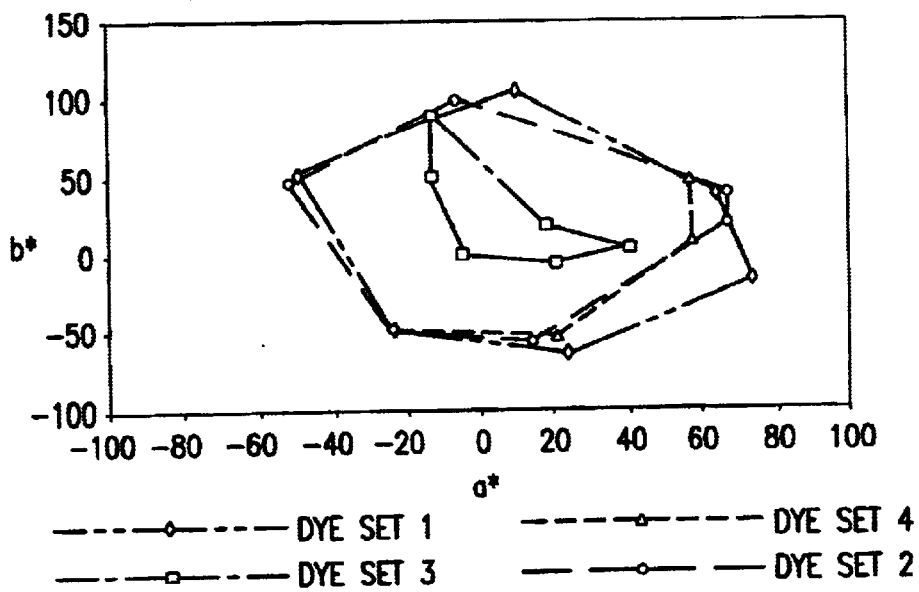
FIG. 3 represents a comparative after-fade color space for the dyes sets represented in FIG. 1

Two sets of color palettes were generated for each dye set 1–4 using the same procedure as described in Example 1. One of the print samples for each of the ink dye set combinations was then exposed to 10 Mlux hours of accelerated indoor lightfade using an Atlas HPUV indoor actinic exposure system, available from Atlas Electric Devices Co., Chicago, Ill., using instrument settings of 50 Mlux for irradiance, a temperature of 25° C., and a relative humidity of 50%. The color coordinates a* and b* of the printed samples for each dye set combination were measured using the procedure described in Example III, above. The comparative after-fade color space for the dyes sets are illustrated in FIG. 3. The color space data for of Dye Set 1 before and after accelerated indoor lightfade, as described in the previous examples, is illustrated in FIG. 4.

As can be noted from the comparative data represented in FIGS. 1 and 3, Dye Set 1, Dye Set 2, and Dye Set 4 all exhibited a high ability to resist fade and Dye set 3 exhibited a significantly reduced ability to resist fade after being subjected to an accelerated indoor light fade test.

Figure 4:
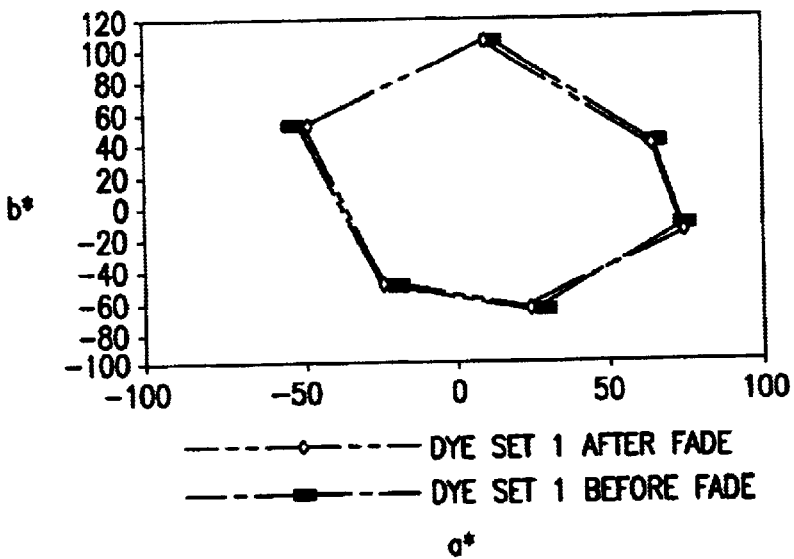
FIG. 4 represents the color space data for of the dye set of FIG. 2 before and after accelerated indoor lightfade.

As can be noted from the data presented in FIGS. 3 and 4, inks formulated according to the invention (comprising Dye Set 1) provided the best lightfade performance and the best match to the Kodak DuraLife® silver halide reference print.

What is claimed is:

1. An ink set for ink-jet printing, comprising:
   a yellow ink comprising Direct Yellow 132 and at least one other yellow dye;
   a magenta ink comprising a dye having the following structure:

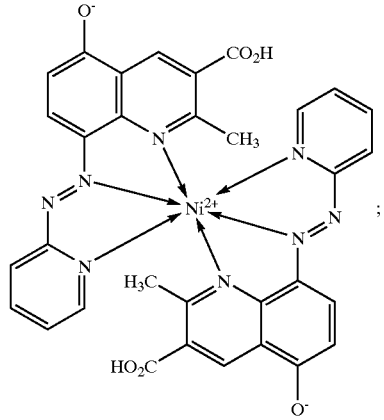

a cyan ink comprising Direct 199; and
   a light dye load magenta ink and/or a light dye load cyan ink.

2. The set of ink-jet inks of claim 1, wherein each of said yellow, cyan, and magenta inks comprises from about 0.1 to about 5 wt % dye.

3. The set of ink-jet inks of claim 2, wherein said yellow ink comprises from about 2.5 to about 4.5 wt % dye.

4. The set of ink-jet inks of claim 3, wherein said yellow ink comprises from about 3 to about 4 wt % dye.

5. The set of ink-jet inks of claim 2, wherein said cyan ink comprises from about 1 to about 4 wt % dye.

6. The set of ink-jet inks of claim 5, wherein said cyan ink comprises from about 1.5 to about 2.5 wt % dye.

7. The set of ink-jet inks of claim 2, wherein said magenta inks comprises from about 0.5 to about 2 wt % dye.

8. The set of ink-jet inks of claim 7, wherein said magenta ink comprises from about 0.5 to about 1 wt % dye.

9. The set of ink-jet inks of claim 1, wherein said light dye load magenta comprises from about 0.05 to about 1 wt % dye.

10. The set of ink-jet inks of claim 1, wherein said light dye load magenta comprises from about 0.1 to about 0.75 wt % dye.

11. The set of ink-jet inks of claim 1, wherein said light dye load cyan comprises from about 0.05 to about 1 wt % dye.

12. The set of ink-jet inks of claim 1, wherein said light dye load cyan comprises from about 0.1 to about 0.75 wt % dye.

13. The set of ink-jet inks of claim 1, wherein each of said yellow, cyan, and magenta inks further comprises:
   about 5 to about 20 wt % of at least one organic solvent;
   0 to about 1.5 wt % of at least one component independently selected from the group consisting of surfactants, buffers, biocides, and metal chelators.

14. The set of ink-jet inks of claim 1 further comprising a black ink that comprises a black dye.

15. The set of ink-jet inks of claim 14 wherein the black dye is Pacified Reactive Black 31.

16. The set of ink-jet inks of claim 14 wherein the concentration of said black dye is from about 0.5 to about 5 wt %.

17. The set of ink-jet inks of claim 16 wherein the concentration of said black dye is from about 1 to about 4 wt %.

18. The set of ink-jet inks of claim 17 wherein the concentration of said black dye is from about 1 to about 2 wt %.

19. A set of ink-jet inks containing yellow, magenta, and cyan dyes for ink-jet printing, said set of inks comprising:
at least one yellow ink containing at least one yellow colorant having a visible light absorbance of about 0.001 to 0.12 at a lambda$_{max}$ of about 401 to 405 and at a 1:10,000 dilution in water;
at least one cyan ink containing at least one cyan colorant having a visible light absorbance of about 0.01 to about 0.27 at a lambda$_{max}$ of about 616 to 620 and at a 1:10,000 dilution in water;
at least one magenta ink containing at least one magenta colorant having a visible light absorbance of 0.01 to 0.57 at a lambda$_{max}$ of about 551 to 555 and at a 1:10,000 dilution in water; and
a light dye load magenta ink and/or a light dye load cyan ink.

20. The set of ink-jet inks of claim 19, wherein said yellow colorant comprises Direct Yellow 132 and at least one other yellow dye.

21. The set of ink-jet inks of claim 19, wherein said cyan ink comprises Direct Blue 199.

22. The set of ink-jet inks of claim 19, wherein said magenta ink comprises a dye having the structure:

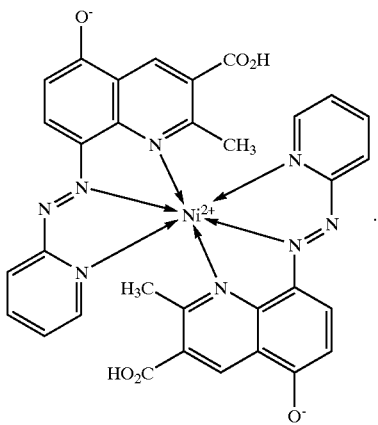

23. The set of ink-jet inks of claim 19, further comprising a wherein said light dye load magenta ink has a visible light absorbance of 0.01 to 0.11 at a lambda$_{max}$ of about 551 to 555 and at a 1:10,000 dilution in water.

24. The set of ink-jet inks of claim 19, further comprising a wherein said light dye load cyan ink has a visible light absorbance of 0.001 to 0.05 at a lambda$_{max}$ of about 551 to 555 and at a 1:10,000 dilution in water.

25. The set of ink-jet inks of claim 19, further comprising a black dye having a visible light absorbance of 0.02 to 0.20 at a lambda$_{max}$ of about 616 to 620 and at a 1:10,000 dilution in water.

26. A method for ink-jet printing, comprising:
providing at least one yellow ink containing at least one yellow colorant having a visible light absorbance of about 0.001 to about 0.12 at a lambda$_{max}$ of about 401 to 405 and at a 1:10,000 dilution in water;
providing at least one cyan ink containing at least one cyan colorant having a visible light absorbance of about 0.01 to 0.27 at a lambda$_{max}$ of about 616 to 620 and at a 1:10,000 dilution in water;
providing at least one magenta ink containing at least one magenta colorant having a visible light absorbance of 0.01 to 0.57 at a lambda$_{max}$ of about 551 to 555 and at a 1:10,000 dilution in water;
providing a light dye load magenta ink having a visible light absorbance of 0.01 to 0.11 at a lambda$_{max}$ of about 551 to about 555 and at a 1:10.000 dilution in water, and/or providing a light dye load cyan ink having a visible absorbance of 0.001 to 0.05 at a lambda$_{max}$ of about 551 to about 555 at a 1:10.000 dilution in water; and
printing said inks on a printing medium by means of an ink-jet pen.

27. The method of claim 26, wherein said yellow ink comprises Direct Yellow 132 and at least one other yellow dye.

28. The method of claim 26, wherein said cyan ink comprises Direct Blue 199.

29. The method of claim 26, wherein said magenta ink comprises a dye having the structure:

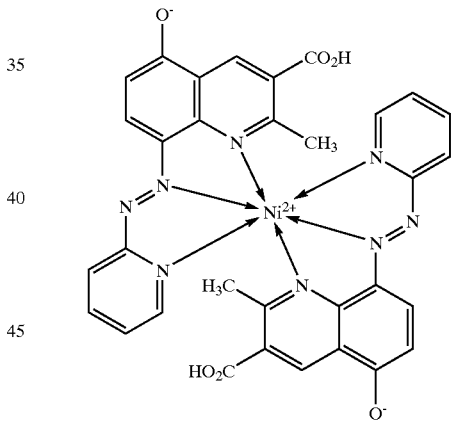

30. The method of claim 26, further comprising providing a black ink prior to printing said inks on a printing medium.

31. The method of claim 30, wherein providing a black ink comprises providing a black ink comprising Pacified Reactive Black 31.

32. The method of claim 30, wherein the black dye has a visible light absorbance of about 0.02 to 0.20 at a lambda$_{max}$ of about 616 to 620 and at a 1:10,000 dilution in water.

* * * * *

UNITED STATES PATENT AND TRADEMARK OFFICE
CERTIFICATE OF CORRECTION

PATENT NO. : 6,682,589 B2
DATED : January 27, 2004
INVENTOR(S) : Morris et al.

It is certified that error appears in the above-identified patent and that said Letters Patent is hereby corrected as shown below:

Column 11,
Lines 49 and 53, after "claim 19," delete "further comprising a".

Signed and Sealed this

Sixth Day of July, 2004

JON W. DUDAS
*Acting Director of the United States Patent and Trademark Office*